United States Patent
Russell et al.

(10) Patent No.: US 11,703,158 B2
(45) Date of Patent: Jul. 18, 2023

(54) HIGH STRENGTH MULTI-USE HOSE

(71) Applicant: AAH HOLDCO, LLC, Union City, PA (US)

(72) Inventors: Jeff Russell, Union City, PA (US); David Wilkins, Union City, PA (US); Robert Maleski, Union City, PA (US)

(73) Assignee: AAH HOLDCO, LLC, Union City, PA (US)

( * ) Notice: Subject to any disclaimer, the term of this patent is extended or adjusted under 35 U.S.C. 154(b) by 23 days.

(21) Appl. No.: 17/176,491

(22) Filed: Feb. 16, 2021

(65) Prior Publication Data

US 2022/0018469 A1  Jan. 20, 2022

Related U.S. Application Data

(60) Provisional application No. 63/052,549, filed on Jul. 16, 2020.

(51) Int. Cl.
*F16L 11/08* (2006.01)

(52) U.S. Cl.
CPC .................................. *F16L 11/085* (2013.01)

(58) Field of Classification Search
CPC ..................................................... F16L 11/085
USPC ......................................................... 138/125
See application file for complete search history.

(56) References Cited

U.S. PATENT DOCUMENTS

| | | |
|---|---|---|
| 4,850,395 A | 7/1989 | Briggs |
| 5,593,527 A | 1/1997 | Schomaker et al. |
| 6,158,476 A | 12/2000 | Sjotun |
| 6,807,988 B2 | 10/2004 | Powell et al. |
| 6,857,452 B2 | 2/2005 | Quigley |
| 7,085,458 B2 | 8/2006 | Morris |
| 7,588,056 B2 | 9/2009 | Lord et al. |
| 8,746,289 B2 | 6/2014 | Quigley |
| 9,040,133 B2 | 5/2015 | Schubert |
| 2004/0132364 A1 | 7/2004 | Wulliman |
| 2008/0072984 A1 | 3/2008 | Branch et al. |

(Continued)

FOREIGN PATENT DOCUMENTS

| | | |
|---|---|---|
| CN | 206072576 U | 4/2017 |
| JP | 3825833 B2 | 9/2006 |

(Continued)

OTHER PUBLICATIONS

Patent Cooperation Treaty (PCT), International Search Report and Written Opinion for Application PCT/US202021/018192 filed Feb. 16, 2021, dated Apr. 27, 2021, International Searching Authority, US.

(Continued)

*Primary Examiner* — Craig M Schneider
*Assistant Examiner* — David R Deal
(74) *Attorney, Agent, or Firm* — McDonald Hopkins LLC

(57) ABSTRACT

A single layer/ply multi-use hose is contemplated. A thermoplastic polymer, such as polyurethane, is extruded through a woven tubular mesh of aramid fibers so as to encourage pillaring through gaps in the mesh of a sufficient amount to improve the overall durability and strength of the resultant hose. This wide diameter (at least 4 inches) and long continuous length (at least 300 feet) hose exhibits excellent durability (e.g., resistance to abrasion and/or punctures) and tensile ratios in excess of 2:1 so as to withstand tensile loads in excess of 100,000 pounds without delamination or bubbling within the hose wall.

19 Claims, 4 Drawing Sheets

(56) References Cited

U.S. PATENT DOCUMENTS

| | | |
|---|---|---|
| 2013/0092276 A1 | 4/2013 | Caneva et al. |
| 2014/0248814 A1 | 9/2014 | Handermann |
| 2015/0308589 A1 | 10/2015 | Krager |
| 2016/0168767 A1 | 6/2016 | Bader |
| 2017/0204250 A1 | 7/2017 | Kasowski |
| 2021/0206134 A1 | 7/2021 | Ryder |
| 2022/0018469 A1 | 1/2022 | Russell |

FOREIGN PATENT DOCUMENTS

| | | |
|---|---|---|
| KR | 1019910014641 A | 8/1991 |
| KR | 1020170062769 A | 6/2017 |

OTHER PUBLICATIONS

Barolli et al., "Conductive, Convective, and Radiative Heat Performance Testing of Fire Attack Hoses," Worcester Polytechnic Institute, Apr. 20, 2016.

__HIGH STRENGTH MULTI-USE HOSE__

CROSS REFERENCE TO RELATED APPLICATIONS

This application claims priority to U.S. Provisional Patent Application No. 63/052,549 filed on Jul. 16, 2020, which is incorporated by reference herein.

TECHNICAL FIELD

The present invention relates to flexible hoses designed to withstand tensile loads while delivering high volumes of fluids over long distances (e.g., greater than 100 m) and, more particularly, to a large diameter, round-cross-sectional hose—as well as a method of making the same—having woven, continuous strand, para- and meta-aramid blend yarn with thermoplastic polyurethane (TPU) extruded through the weave so as to promote specific levels of penetration or "pillaring" within the jacket by the TPU, resulting in a single-ply construction (i.e., no layering of separate materials) so that the TPU is exposed to the fluid flowing through the hose and the ambient environment on its opposing side. This hose will have particular utility in agricultural applications, but could also be used as a feeder hose, in marine, military, mining, and/or other settings where ice or internal abrasions present unique challenges.

BACKGROUND

Hoses having long lengths require a unique blend of strength and capacity. By definition, these hollow tubular structures include a cylindrical wall defining a fluid passage. That wall must possess sufficient structural integrity in the face of pressure exerted by the fluid being transported by that hose, while simultaneously being durable and flexible enough to allow the hose to be handled and transported. Hoses that are capable of delivering high capacity (i.e., larger diameter) over significant distances (i.e., length of 300 feet or more) are particularly useful. However, material costs, weight of the hose, and strength/ability to withstand both internally exerted pressure and external forces/abrasions are all significant considerations that must be further balanced by the length of the hose needed, especially in operations where it may be impractical to couple together smaller sections of individual hoses.

As an example, agricultural hoses typically come in minimal lengths of about 330 feet (~100 m) and often up to 660 feet (~200 m) to allow for the conveyance of fluids over long distances, as may be encountered in a planting field or farming operation. The diameter of these hoses (and, by extension the volume of fluid delivered therein) is significantly larger than most other hose types, with preferred diameters of greater than 4 inches (~10 cm) and possibly approaching 8 to 9 inches (~20 to 23 cm) or even up to 12 to 16 inches (~30 to 40 cm). Nevertheless, agricultural and other strong, high capacity hoses must be flexible so as to accommodate storage, frequent repositioning, and use changing environments and terrains where less flexible solutions (e.g., metallic or rigid tubing) is impractical.

Agricultural and other high strength and capacity hoses (e.g., for use in marine, military, mining, construction, water/food, and other industrial applications) must also be durable. Foremost, the outer facings of the hose must be resistant to cuts, punctures, and abrasions, as these hoses are often dragged over rough terrain and/or through rocky/jagged bore holes and other confined spaces on a regular basis. Owing to potentially exponentially larger volumes of pressurized fluid carried within large diameter hoses (as compared to smaller diameter hoses), these hoses must also possess tensile ratio of at least 2:1 (i.e., the tensile load capability of the hose in comparison to the weight of the fluid along a given length of the hose). Further still, these hoses must be a single, unitary construction, as coupling together smaller high strength hoses is impractical owing to the cost of the couplings and multiplicity of potential failure points such arrangements necessarily entail.

The strength of a large diameter, high capacity hose can be qualitatively reflected by its resistance to delamination. That is, most hoses employ multiple layers. Repeated stress to the hose structure over time will eventually cause the outer-most layer/jacket to "bubble" or delaminate, thereby signaling a future/imminent failure.

U.S. Pat. No. 8,746,289 describes a spoolable pipe with a layered construction. The disclosed pipe can be negatively buoyant, corrosion-resistant, and light weight.

U.S. Pat. No. 7,588,056 discloses methods and systems for a flexible hose including a core tube made of fluid-impervious materials. An aramid sleeve, woven with an open or closed mesh, circumferentially covers this core tube. The core tube is specifically formed to have a smooth-bore finish along its inner surface.

U.S. Pat. No. 6,857,452 contemplates a laminate-constructed, spoolable tube. The tube includes a fiber composite layer with a unique triaxial braid construction.

Korean Patent 1019910014641A describes a non-metallic, corrosion-resistant conduit. Circumferentially spaced helical strengthening ribs are provided along a plastic liner. Methods of making this type of conduit are also provided.

Separately, All-American Hose LLC (Union City, Pa.) sells a number of agricultural hoses, including under its branded line of TSX hoses. These hoses rely upon TPU extruded through a polyester weave, with diameters ranging from 4.5 to 7.25 inches (~11 to 18.5 cm). Other known competitive agricultural hoses attempt to mimic this construction, although all of these hoses tend to have tensile strengths of about 30,000 to 75,000 pounds and weights between 1.30 to 2.30 pounds per foot (0.180 to 0.319 kg/m).

In view of the foregoing, a large diameter (i.e., >4 inches) and long-length (i.e., >300 ft.) hose having sufficient strength and capacity would be welcome. Specifically, such a hose having greater than 2:1 tensile ratio and/or exceeding 100,000 pounds (and, more ideally, 140,000 pounds) of tensile strength would be welcome.

SUMMARY OF INVENTION

A single ply, high strength and high capacity hose is contemplated. A thermoplastic polymer, such as polyurethane, is extruded through a woven mesh of aramid fibers so as to encourage pillaring through gaps in the mesh of a sufficient amount to improve the overall durability and strength of the resultant hose. This wide diameter hose (at least 4 inches and up to 9, 12, or even 16 inches) exhibits tensile ratios in excess of 2:1 while being capable of withstanding tensile loads in excess of 100,000 pounds.

Still other aspects of the invention are disclosed and discernible to those having skill in this field. In this regard, specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings, which are incorporated as part of this disclosure.

DETAILED DESCRIPTION

Figure 1:
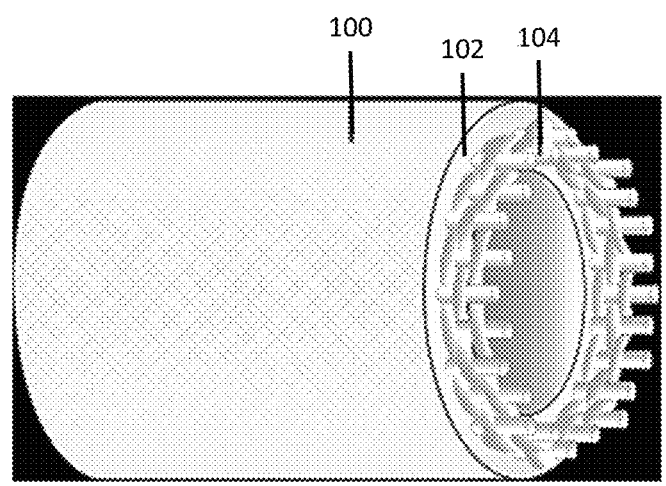
FIG. 1 is a three dimensional, schematic illustrating the extruded through the weave construction according to the invention.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise. Any descriptions and drawings in this disclosure, and any written matter within the drawings, should be deemed to be reproduced as part of this specification.

Since their commercial introduction in 1961, aramid fibers have been prized for their lightweight form and structural strength. Generally speaking, these fibers are polymerized chains of poly(phenylene terephthalamide). These polymers are further characterized by the location of the polymer linkage, with poly-paraphenylene terephthalamide, or para-aramid fibers, being sold commercially as Kevlar® and poly-m-phenylene isophthalamide, or meta-aramid fibers, being sold commercially as Nomex®. Para-aramids may be further classified as standard tenacity (e.g., Kevlar®) or high modulus (e.g., Heracron®), either or both of which may be incorporated into certain aspects.

Each of these classes of aramid fibers exhibit numerous desirable properties (e.g., low thermal shrinkage, low electrical conductivity, low elongation to break, high chemical resistance, etc.). However, meta-aramids tend to have lower tensile strength, higher elongation, and greater solubility in comparison to para-aramids. In some applications, composite blends of para- and meta-aramid could be employed. Table 1 provides comparative insights on specific types of aramids, each identified by its commercial name.

TABLE 1

| Exemplary aramid fiber characteristics | | | |
|---|---|---|---|
| Brand name | Type | Density (g/cm³) | % Elongation |
| Kevlar 149 | Para- | 1.47 | 1.5 |
| Kevlar 49 | Para- | 1.45 | 2.8 |
| Kevlar 129 | Para- | 1.45 | 3.3 |
| Kevlar 119 | Para- | 1.44 | 4.4 |
| Nomex | Meta- | 1.38 | 22 |

In the context of this invention, a composite of para-aramid fiber is preferably provided in filament (continuous strand) yarn. Specifically, warp yarn of 1500-8 ply, 1.65 twist/inch and filler yarn of 1500-7 ply, 3.83 twist/inch are woven into a mesh, as further described below. Preferred sources and grades include: Kevlar 29 (DuPont), Kevlar 49 (Dupont), Twaron (Teijin), Technora (Teijin), Alkex® AF1000 (Hyosung), and Heracron® HF200 (Kolon), as well as other comparable para-armid fibers. Combination or composite yarns made from two or more of these examples can also be employed.

Continuous blended aramid fibers (as contemplated above) are woven into a mesh-like jacket. The warp threads W run parallel to one another along the axial length A of the hose 100 and the fill (or weft) threads F oriented primarily in a radial plane of the hose 100 at an approximate 90° angle relative to the warp threads.

The inventors discovered that the interstices formed by the warp and fill threads plays a key role in retaining the extruded TPU. In particular, a sufficient number of voids must permit the TPU to penetrate the weave while remaining structurally connected and intact. In this manner, the extruded material appears to form "pillars" throughout the jacket/woven material in question. In order to achieve all of the aforementioned performance characteristics that are unique to hoses requiring high tensile strength (along with the other properties contemplated herein), the inventors determined a methodology for measuring such "pillaring."

In particular, pillaring can be measured quantitatively by cross-sectioning a hose or jacket and inspecting or scanning a representative surface area dedicated to yarn versus TPU.

In this manner, the exposed TPU will necessarily encompass TPU that traverses gaps in the weave. For greater accuracy, it is possible to measure and exclude/subtract out sections/layers where TPU is aligned in the planes above and below the plane defined by the yarn/weave. In this instance, the voids or interstices created by the risers and sinkers can provide for more precise measurement of the actual pillaring (i.e., the TPU/material embedded therein).

Additionally or alternatively, gap spacing, and the pillaring it permits during extrusion, can also be calculated based upon the selection of yarns. In particular, the warp yarn may be of a different size (i.e., effective diameter) in comparison to that of the fill yarn. Thus, by changing the denier and/or plying relative to one another, the inventors determined gaps could be deliberately created in the weave for the purposes of pillaring. In turn, the pillaring helps enmesh the weave within the extruded materials, thereby improving the strength and durability of the resulting hose.

Significantly, warp yarn runs along the longitudinal axis of the hose (i.e., axis A in FIG. 3), while the fill or weft yarn is woven relative to the radius of the hose. This means that the fill yarn has conventionally been understood to influence the hoop stress of a woven hose material, while the warp yarn runs longitudinally and carries the tensile load. Appropriate selection of materials for the fill and warp yarns was believed to influence the resultant load capacity of the hose.

However, the inventors determined, by adjusting the comparative sizes (e.g., the thickness) of each of these yarns, sufficient gaps could be formed for pillaring without impairing the desired tensile strength/loading. In fact, by selecting aramid yarns, the inventors have realized a significant improvement in the tensile strength/loading while simultaneously eliminating the need for multiple layers in the hose structure (such as the hose taught in U.S. Pat. No. 7,588,056).

Figure 5:
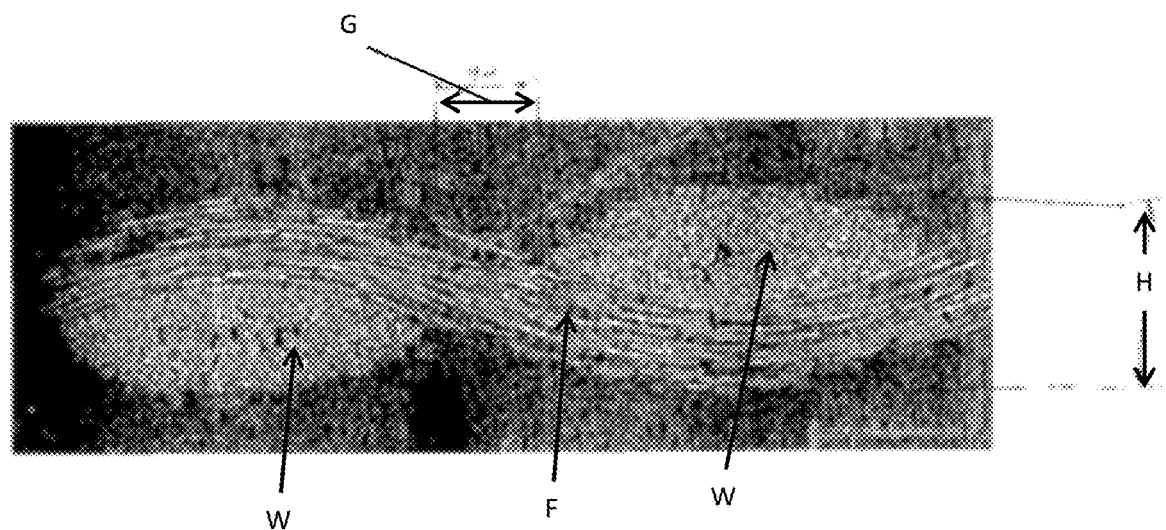
FIG. 5 is a perspective, schematic illustration showing the relative angular orientation of the fill yarn relative to the warp yarn in a weave according to certain aspects of the invention.

By assuming a circular cross sectional shape for the warp and fill yarns (and with further reference to FIGS. 2 and 5), the prospective gap width for each yarn can be calculated based upon measurement of each yarns' flat width and thickness, the centerline circumference of the weave, and the number of ends/picks in the weave. In turn, multiplying the linear width of the warp and fill gaps provides the surface area of the gap (hereafter referred to as the "root area"). Thus, when TPU (and/or other materials, as noted herein) are extruded at an appropriate rate, each gap is presumed to be completely filled and occupied by the TPU, thereby making the root area representative of the size of each "pillar" penetrating through the weave.

Insofar as the warp remains stationary while the fill is angled to "bend around" the warp, it is possible to determine the presumptive height of the pillar extending through the gap by assuming or measuring the angle of the fill yarn rise and fall relative to the plane defined by the warp yarn (coupled with the other characteristics of the yarns/weave noted above). In this manner, the pillars can be further characterized by an "aspect ratio" representing the height of the gap/pillar relative to the area of the root. Typical weaves might be expected to have an angle between 15 to 45 degrees for this calculation, including but not limited to 30 degrees and/or other integers falling within this range. These ratios are unitless and can be calculated by comparing the volume of the hose against the size of the warp and filler yarn thickness and picks/ends in that volume to arrive at presumptive void space that represents the gaps to be filled by the "pillared" thermoplastic (it should be noted that these voids are expected to be completely filled by the nature of the extrusion process, which forces the molten polymer over and through the woven mesh of yarns).

In this manner, the inventors determined that ideal ranges and characteristics for pillaring include any of the following (for a nominal 7 inch diameter hose):

Pillar aspect ratios (height of pillar/root area) of equal to or less than 50, greater than or equal to 5, between 10 and 45, and equal to or less than 35 units at 30 degree angles and equal to or less than 60 units, greater than or equal to 5, between 15 and 55 units, and equal to or less than 40 units at 45 degrees. Combinations of integers falling within any of these stated limits or ranges are also expressly contemplated, so that it is possible to match the minimum or maximum of one stated range with a parameter of another contained herein (e.g., between 10 and 35; between 5 and 5; etc.).

Individual pillar root areas greater than 0.0010 or 0.0015 square inches, between 0.0016 and 0.0028 square inches, and 0.0013, 0.0019, 0.0021, or 0.0026 square inches.

Still further characteristics, including absolute values and preferred ranges can be discerned from the inventive examples provided in Table 2.

The root area and/or gap (i.e., along its entire height) may also be characterized relative to the warp and/or fill yarn itself. Thus, the values identified above can be restated relative to warp and/or fill yarn thicknesses (in inches) of 0.033, 0.035, 0.040, 0.045, 0.048, and 0.050. Any of 5, 6, 7, 8, and/or 9 ply yarns may be employed, with deniers of 1500, 2600, and/or 3000 contemplated. These variables enable adjustments to the thickness and weave characteristics in order to achieve the preferred aspects ratios contemplated herein.

Table 2 below provides an exemplary comparison of conventional polyester woven meshes with extruded thermoplastic against a variety of inventive aramid woven meshes with the same thermoplastic. As mentioned above, the angle of the filler yarn relative to the warp strands may vary, so that two separate exemplary values are provided in Table 2 (i.e., one in which that angle is 30 degrees and a second in which it is 45 degrees). In both instances, the yarn selection is such that the area of the root (for each pillar) is comparatively larger, thereby resulting in a smaller ratio than previously realized by most exemplary polyester weaves.

In effect, by knowing the diameter/circumference of the final hose and the thickness of the warp and filler yarns (and as alluded to above), it becomes possible to calculate and compare the per unit length gaps or voids within the weave (i.e., the difference between the volume of the yarns in the weave) that will become filled by thermoplastic during extrusion. Without wishing to be necessarily bound by any theory of operation, it is believed that this manipulation of the void which becomes filled by the extruded thermoplastic is as important the nature of the aramid fibers (and/or that the combination of the two create an unexpected, synergistic effect) in terms of delivering the final strength, load capacity, and other desirable traits noted herein. Thus, selection of appropriate thickness for both the warp and filler yarns is helpful in this regard.

TABLE 2

Comparison of weave characteristics for conventional polyester yarn and inventive aramid yarn weaves, based upon a weave with 265 ends, 49.5 picks/4 inches, and a centerline circumference of 23.91143 inches.

|  | Polyester | | Poly-Aramids | | | |
| --- | --- | --- | --- | --- | --- | --- |
|  | C1 | C2 | I1 | I2 | I3 | I4 |
| Warp Yarn thickness (in) | 0.045 | 0.052 | 0.033 | 0.035 | 0.040 | 0.045 |
| Warp Gap Width (in) | 0.04540 | 0.03838 | 0.05745 | 0.05544 | 0.05042 | 0.04540 |
| % WY width (% of CL Circum) | 0.49872 | 0.57629 | 0.36572 | 0.38789 | 0.44330 | 0.49872 |
| % Gap width (% of CL Circum) | 0.50128 | 0.42371 | 0.63428 | 0.61211 | 0.55670 | 0.50128 |
| Filler Yarn Thickness (in) | 0.048 | 0.0555 | 0.033 | 0.035 | 0.040 | 0.045 |
| Filler Gap Width (in) | 0.03314 | 0.02557 | 0.04830 | 0.04628 | 0.04122 | 0.03617 |
| FY width (% of 4") | 0.59400 | 0.68681 | 0.40838 | 0.43313 | 0.49500 | 0.55688 |
| Gap width (% of 4") | 0.40600 | 0.31319 | 0.59163 | 0.56688 | 0.50500 | 0.44313 |
| Pillar Root Area | | | | | | |
| Warp Gap (Gw) Width (in) | 0.0454 | 0.0384 | 0.0574 | 0.0454 | 0.0454 | 0.0454 |
| Filler Gap (Gf) Width (in) | 0.0331 | 0.0256 | 0.0483 | 0.0463 | 0.0412 | 0.0362 |
| Pillar Root Area (Gw × Gf) | 0.001505 | 0.0010 | 0.0028 | 0.0021 | 0.0019 | 0.0016 |
| Pillar Height @ 30 deg | | | | | | |
| Filler Yarn Thickness (in) | 0.048 | 0.0555 | 0.033 | 0.035 | 0.04 | 0.045 |
| Filler angle | 0.5235 | 0.5235 | 0.5235 | 0.5235 | 0.5235 | 0.5235 |
| Pillar Height (in) | 0.0554 | 0.0641 | 0.0381 | 0.0404 | 0.0462 | 0.0520 |
| 30 deg. Aspect Ratio(H:A) | 36.8307 | 65.313 | 13.733 | 19.235 | 24.677 | 31.636 |
| Pillar Height @ 45 deg | | | | | | |
| Filler Yarn Thickness (in) | 0.048 | 0.0555 | 0.033 | 0.035 | 0.04 | 0.045 |
| Filler angle | 0.7853 | 0.7853 | 0.7853 | 0.7853 | 0.7853 | 0.7853 |
| Pillar Height (in) | 0.0679 | 0.0785 | 0.0467 | 0.0495 | 0.0566 | 0.0636 |
| 45 deg. Aspect Ratio(H:A) | 45.1063 | 79.989 | 16.818 | 23.557 | 30.221 | 38.744 |

Figure 6:
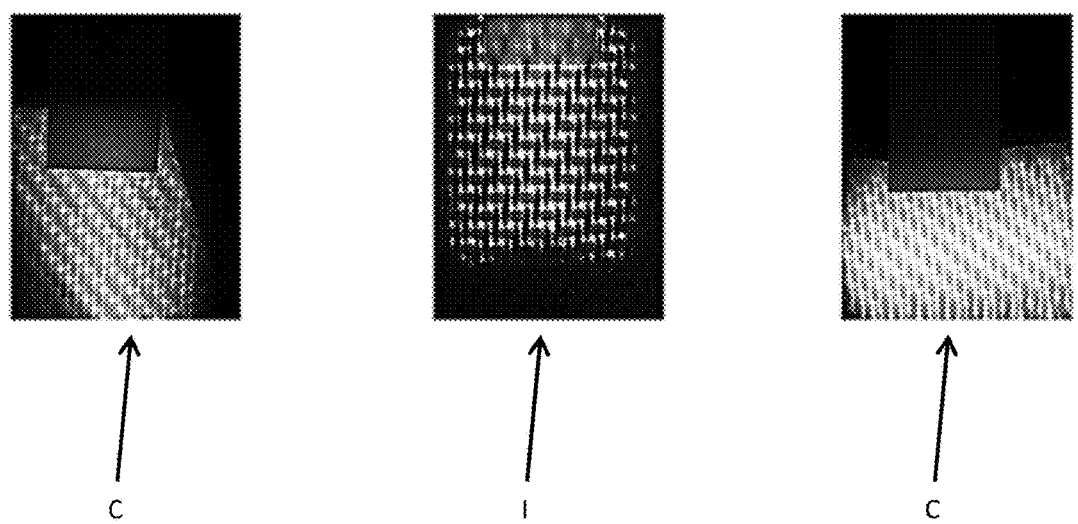
FIG. 6 are a series of comparative photographs of weaves removed from conventional hoses C and an inventive hose I, with backlighting to highlight the larger and more clearly defined gaps that provide for greater pillaring in comparison to the conventional hoses C.

It is also possible to characterize root area and gap by removing a standardized area of weave from the hose and then measure the amount of light passing through it. Processing software can approximate the number and size of the gaps and/or comparative or qualitative observations are possible. The more light passing through the weave, the larger the overall root area. In order to achieve single-layer hoses of sufficient tensile strength with good adhesion between the mesh the thermoplastic, larger gaps (in comparison to conventional and currently available nylon mesh hoses) have been found to produce the best results, particularly when the yarns are aramid fiber. FIG. 6 shows such a comparison, with inventive hose I having a more clearly visible and regularly spaced set of backlit gaps in comparison to the conventional hoses C (where the main feature is the weave itself, with little to no gaps provided/visible).

This approach leads to a counter-intuitive result—in order to increase the strength and adhesion of the weave and the thermoplastic, the inventors selected a weave pattern (including the thickness of the fibers) that actually creates larger gaps in the mesh. This is qualitatively illustrated by comparing the photographs in FIG. 6 (and could be further characterized in a more formal manner through comparative measurement and analysis of the distinct light and dark areas in a standardized section of hose). That is, the inventive hose I exhibits a regular pattern of large and distinctive gaps—as shown by the sharply contrasting white light shining/penetrating through the blackened weave. In comparison, the light behind the conventional hoses C is more diffuse so as to illuminate the contours of the weave, but without the distinctive contrasts. This effect can be attributed to the height:area aspect ratios in Table 2 and/or weave pattern in FIG. 2, where the larger area of the gaps of the inventive weave produces comparatively smaller ratios than those of the conventional hoses.

However, the importance of materials selection should not be overlooked. The properties of the aramid fibers, combined with the use of the thermoplastics described herein and the selection of appropriate weave characteristics, all contribute to the improved strength of the hose. Thus, it is possible to realize improved strength by virtue of an aramid weave and thermoplastic extrusion without necessarily incorporating the aspect ratios noted above, but even greater results can be achieved through judicious yarn selection and weave execution, especially with respect to pillaring/aspect ratios, all as may be described and depicted herein.

While TPU is particularly useful in sustaining the pillaring required by this invention, it should be understood that other, selected thermoplastics may also be useful. For example, thermoplastic vulcanizates (TPV), such as Santorprene™ sold by ExxonMobil Chemical, can be extruded under similar conditions and with similar results as TPU. Thus, while TPU specifically refers to and embraces the various grades of thermoplastic polyurethane, it will be understood to more broadly include other resins that possess the same properties, both in terms of processing/manufacturing conditions and as incorporated into a final, extruded product.

To that end, TPU is a block copolymer of covalently bonded low and high polarity segments. These segments are formed by a reaction of diisocyanates with short and long chain diols, and the precise ratio, structure, and molecular weight of these reactants allows for fine tuning the properties of the resulting TPU. Further, the miscibility of the differing segments (which can generally relate to the difference in their respective glass transition temperatures (Tg)) and the crystallinity of the materials may also be influential.

Polyester-based (e.g., derived adipic acid esters) and polyether-based (e.g., based on tetrahydrofuran ethers) constitute specific types of TPU, with each capable of being injection molded and delivering good abrasion resistance, low temperature flexibility, and mechanical properties. Conversely, differences in their properties is most notable with respect to adhesion strength, long-term heat exposure, and resistance to microbes, hydrolysis, and chemical reactants.

FIG. 1 shows a schematic illustration of the hose 100. Extruded layer 102, such as TPU, encases an open aramid weave/mesh 104. In this manner, the aramid weave/mesh is not deliberately exposed to the ambient environment or the fluid carried within the hose, and its primary purpose to deliver sufficient structural strength, including by way of the pillaring described herein.

Figure 2:
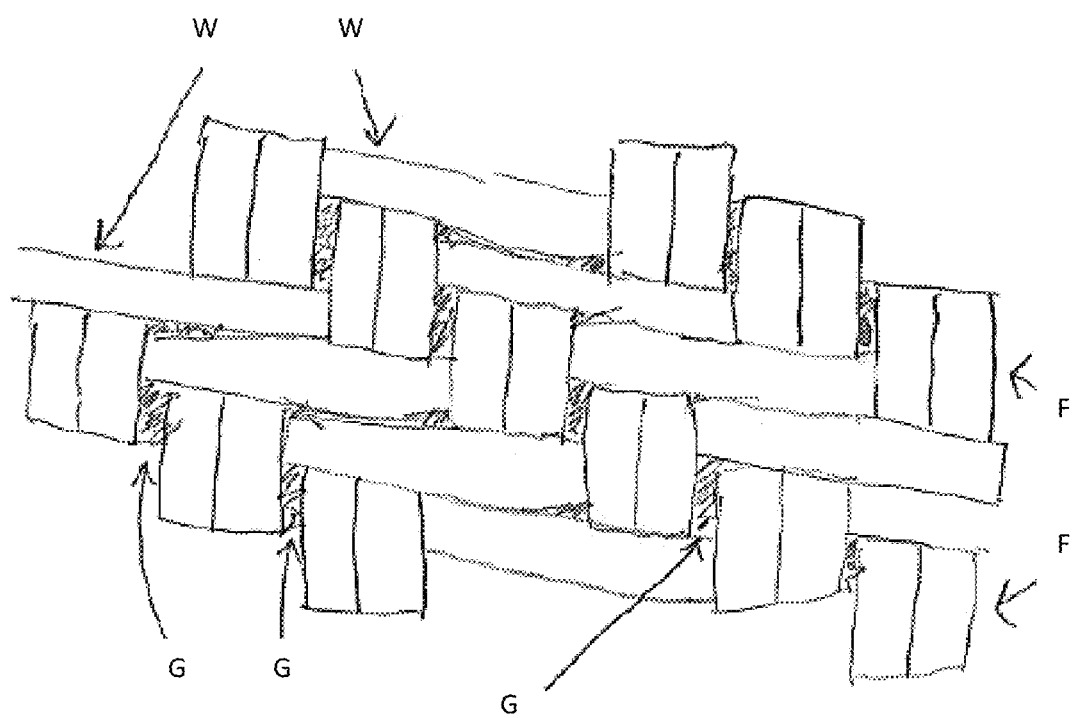
FIG. 2 is an exemplary top plan view of a weave pattern that provides gaps for pillaring as required by the invention.

FIG. 2 more specifically illustrates a weave pattern in which the warp strands W and filler strands F are interwoven so as to leave deliberate gaps in the resultant fabric sheet. As a non-limiting example, each warp risers and sinkers traverse two separate strands of filler. In turn, two strands of filler yarn are paired together and similarly traverse two separate strands of warp. This pattern creates small gaps G, which are enable and allow for TPU or other similar extruded resins to deliberately penetrate the sheet and form pillars as described above. Other approaches for forming gaps G are also possible (e.g., increasing the number threads traversed by the respective risers and sinkers, pairing additional strands of thread in the pattern, decreasing the strand diameter, etc.).

Notably, and especially in comparison to protective function a woven jacket provides in other hoses (e.g., fire hoses), the approach of leaving gaps G may be counterintuitive. That is, because the weave is intended to protect everything enclosed by it, the deliberate provision of small gaps would seem to weaken the weave, whereas the inventors determined the pillaring ratios disclosed herein actually provide the hose with its improved performance, including enhanced the structural strength by embedding a structural support within the extruded/TPU layer(s).

Thermoplastic polyurethane is then extruded through this woven aramid mesh. In particular, a through the weave extrusion process is utilized in which the jacket runs though the rubber extrusion head. This approach simultaneously coats the weave on the inside and outside with TPU. Alternative extrusion materials may include ethylene propylene diene monomer rubber (EPDM), mixtures of EPDM and styrene butadiene rubber (SBR), polychloroprene (e.g., Neoprene), and other nitrile rubber derivative compounds, depending upon the precise nature of the desired performance characteristics.

The TPU pillaring network extending through the aramid weave creates a unitary hose with improved durability that is ideal for the various types of hoses contemplated herein. Pressurization of the hose (by fluid flowing therethrough) may further improve the enmeshing by urging the TPU 102 into closer contact with the aramid weave 104.

Significantly, this pillaring effect can be leveraged in other combinations of extruded materials and mesh weaves. For example, an alternative extrusion material could be paired with a nylon, polyester, and/or aramid warp and fills yarns. As above, the key trait is to allow for sufficient gaps to promote the pillaring that sustains the structural integrity of the protective, extruded material while simultaneously selecting materials and weave patterns that have sufficient tensile strength and compatible diameters for spacing and gap creation.

Figure 3:
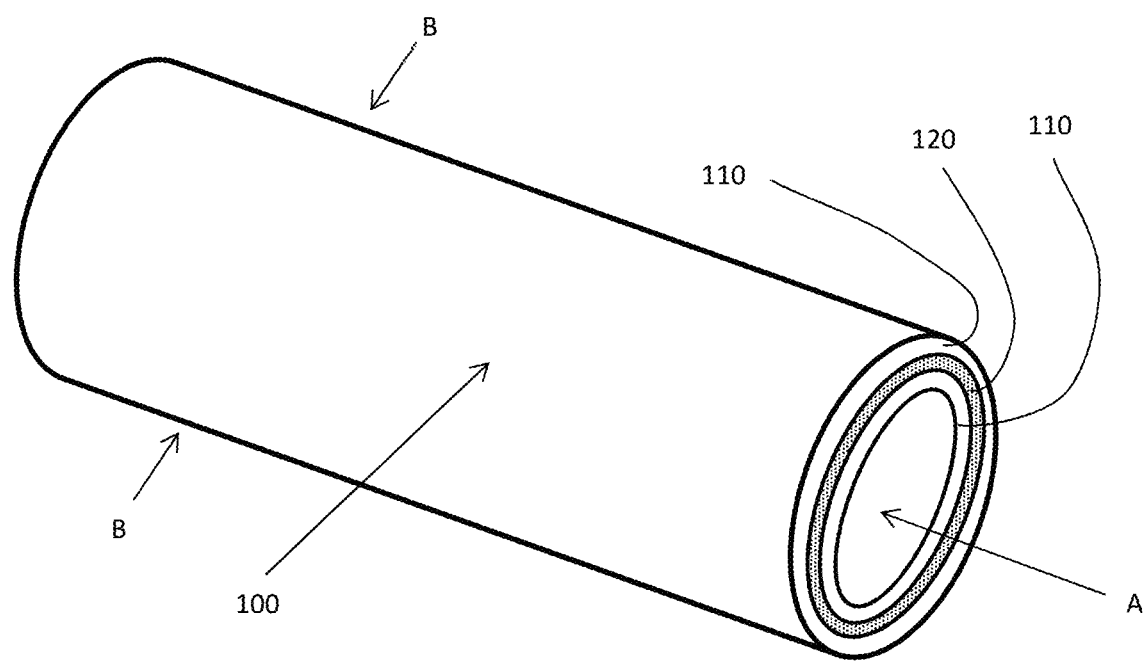
FIG. 3 is a three dimensional, perspective view illustrating the cross sectional construction of a multi-use hose according to certain aspects of the invention.
Figure 4:
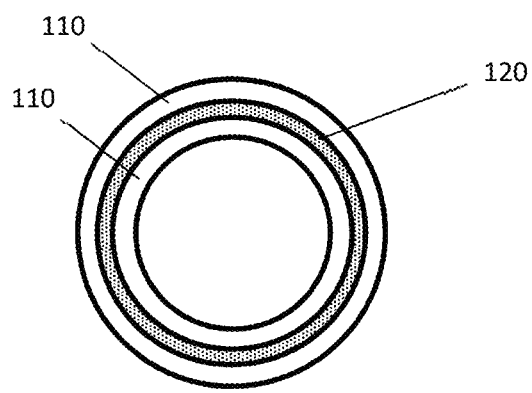
FIG. 4 is a cross sectional views taken along line B-B in FIG. 3 so that the depiction is orthogonal to the hose longitudinal axis A.

FIGS. 3 and 4 shows a cross sectional view of an exemplary inventive hose 100 in which the TPU layers 110 can be distinguished from the pillared TPU/weave layer 120. This close contact and elimination of inner and outer jackets prevents the problem of delamination and bubbling experienced in prior art agricultural or other hoses.

Standard hose lengths would be 330 feet (~100 m) or 660 feet (~200 m), although any length in excess of 330 feet (~100 m) and up to 1,320 feet (~400 m) can be constructed according to this invention. The preferred diameter would be at least 4.5 inches (~11 cm), with at least a 2:1 tensile ratio, at least 600-750 PSI (~41.4-51.7 bar) burst pressure ratings, and/or tensile strengths exceeding 100,000 pounds.

Further, it will be understood that the necessity for such long lengths of hose is neither trivial nor easily solved by coupling smaller sections of hoses. In particular, each coupling point on a hose represents a potential weak point where leaks could develop owing to imperfect seals, incorrect or misaligned coupling, and increased chances for becoming entangled, owing to the fact that conventional couplings exceed the diameter of the hose itself. Additionally, coupling mechanisms add costs that can be avoided by providing a single, continuous line of hose.

Hoses made according to the constructions and methods contemplated herein exhibit superior performance characteristics. In addition to possessing the requisite 2:1 tensile ratio, these hoses will have diameters of greater than 4 inches (~10 cm)—including 5, 6, 7, 8, 9, 10, 12, and 16 inch diameters (~10, ~12.5, ~15, ~17.5, ~20, ~22.5, ~25.5, ~30.5, and ~40.5 cm)—that accommodate vastly improved load capabilities. Specifically, loads in excess of 100,000, 120,000, and even 140,000 pounds are possible. When coupled with the extended lengths required by some hose applications, these capabilities form a key distinguishing features over existing solutions.

Further aspects of the invention may be discerned from careful study of the features illustrated in the drawings. While structures that are most pertinent to the operation of the hose are highlighted above, still further functions and structures will be appreciated by skilled persons upon studying the drawings in their entirety, particularly with respect to substitution of materials and methods of manufacture.

In addition to providing structural integrity and desired length, strength, and tensile ratios, the materials should also be selected for workability, cost, and weight. Various standard testing methods, particularly those established by American National Standards Institute (New York, N.Y.), UL (Northbrook, Ill.), and/or the National Fire Protection Association (Quincy, Mass.), may be useful in characterizing the components and/or overall performance of the invention contemplated herein, particularly with respect to durability of the hose. ASTM D3389-10 (abrasion), NFPA 1961 (abrasion), and UL 19 "Lined Fire Hose" all provide informative metrics.

Materials selection is a key aspect of the synergistic effects of the pillaring described herein. Therefore, arbitrary or speculative substitutions of the materials and methods of making may be impractical, cost prohibitive, and/or otherwise not amenable to manufacturing processes and performance expectations inherent to the intended use/application for the hose. In the foregoing disclosure, it will be understood that materials selection, processing techniques, and resultant hoses involve highly specialized considerations in which substitutions and changes may not be feasible or readily apparent to those skilled in in this field.

In view of the foregoing, various disclosed aspects of a single ply, continuous length (preferably at least 300 feet or more in length) and high strength (preferably at least a tensile ratio of at least 2 to 1) comprise and/or consist of any combination of the following elements:

a woven tubular mesh including aramid fibers encased within a thermoplastic polymer;

a woven tubular mesh having or consisting of a warp yarn with a stated thickness and a filler yarn with a thickness to produce a height of the woven tubular mesh, said warp and filler yarns woven in a pattern to produce a nominal height and a gap area in the woven tubular mesh;

a thermoplastic polymer extruded through the woven tubular mesh to completely fill the gap area along the nominal height throughout some or all of the woven tubular mesh;

wherein the hose possesses a tensile ratio of at least 2 to 1;

wherein the woven tubular mesh and/or warp and filler yarns all/each consists essentially of aramid or para-aramid fibers.

wherein the thermoplastic polymer is thermoplastic polyurethane and/or thermoplastic vulcanizate;

wherein the hose has a continuous length of at least 300 feet and an inner diameter of at least 4.5 inches when the hose is in use;

wherein the continuous length is less than or equal to 1,320 feet and the inner diameter is less than or equal to 16 inches;

wherein the hose has tensile strength greater than 75,000 pounds;

wherein the hose has tensile strength between 100,000 and 200,000 pounds;

wherein the thermoplastic polymer is extruded so as to create a contiguous layer of the thermoplastic polymer on one or both of inner and outer facings of the woven tubular mesh (i.e., the mesh is completely encased);

wherein the hose has a bending radius of at least 90 degrees without kinking or permanently deforming the woven tubular mesh or the thermoplastic polymer; and wherein a height-to-area aspect ratio for thermoplastic pillars penetrating the woven tubular mesh is less than 35 and preferably between 14 and 32 when a filler yarn angle is at 30° or less than 40 and preferably between 16 and 38 when a filler yarn angle is at 45°.

Furthermore, various methods of making single ply hoses are contemplated as aspects of the invention. For example, a hose having a tensile ratio (as defined above) of at least 2:1 can be achieved by selecting first and second aramid yarns, each of which has a discrete and differing thickness. These respective thicknesses are further selected to ensure that aspect ratio (height:root area of the gap in the weave) is attained, all as quantified above/herein. These yarns are then woven into a tubular mesh, and a thermoplastic material is extruded through an inner facing and/or outer facing of the tubular mesh, with sufficient thermoplastic material provided to form complete and contiguous layers on the inner and outer facings of the tubular mesh. In some aspects, the tubular mesh is woven to have a length of between 300 and 1,320 feet, and a nominal diameter of between 4 and 16 inches. In some aspects, the thermoplastic material is TPU or TPV. Still further limitations to this method can be discerned with reference to the foregoing disclosure.

Nevertheless, it is also understood that the invention may not to be limited only to the embodiments disclosed. Minor alterations to materials and methods are possible without departing from the scope of the appended claims or the equivalents thereof, so long as the tensile strength, long-length unitary construction, and flexibility requirements are met. For example, different grades of TPU or TPV could be selected, weave patterns could be altered to promote further pillaring, and/or the length and diameter of the hose all qualify as minor alterations.

The invention is expected to have immediate and particular utility in the field of agricultural hoses. "Drag line" agricultural hoses are frequently repositioned and, therefore, must be comparatively light weight, flexible, and of a sufficient unitary length (so as to avoid the issues of coupling noted above). Further, the exterior surface must be durable enough to withstand frictional forces when the hose is dragged over uneven ground, while the remaining construction must accommodate high fluid pressure and, in some instances, abrasive flow attributed to ice or other solids or particulates.

Hoses made according to this disclosure can be employed in still further uses. For example, agricultural applications also rely on "main line" feed that handles significantly larger volumes than the drag lines. Mining applications expose the exterior of the hose to even harsher friction-induced environments (e.g., jagged and abrasive rocks/edges encountered within a well/bore hole, greater temperature variations including possible partial freezing and ice formation on and in the hose, etc.). Marine and military applications emphasize the need for high capacity and comparatively light weight. Water and food transport applications would also benefit from the tensile strength, portability, and comparatively higher capacities (in comparison to existing solutions within that field). And, in all of these applications, the flexibility of a hose (in comparison to rigid tubes or pipes) is advantageous if not critical.

As used herein, flexibility should be understood to mean that the hose can withstand positioning at extreme bend radii (e.g., being formed into angle approaching or often exceeding) 90° without kinking or other permanent changes or deformation to the shape of the hose itself (i.e., the mesh and/or thermoplastic). In contrast, a wire-reinforced sleeve or rigid or semi-rigid tube lacks the resilience of a true hose because the wire reinforcement will fail to return to its original shape. In the same manner, the length of rigid tubing is limited by practical considerations (e.g., transportation of the tube itself), meaning that coupling, welds, or other means of affixing discrete segments of tubes becomes necessary, with each connection point representing a potential mode of failure (in short, meaning that rigid tubes such as pipes are completely are not analogous to hoses). Yet another distinctive advantage of flexible hose in comparison to reinforced or rigid tubes or pipes is the fact that, when not in use, a flexible hose is collapsible. In turn, the collapsible and resiliently bendable nature of flexible hoses allows them to be coiled and stored without occupying nearly the volume/space required by less or non-flexible alternatives.

What is claimed is:

1. A single layer, flexible hose consisting of: a woven tubular mesh including aramid fibers, wherein said fibers are completely encased within a thermoplastic polymer and wherein the hose possesses a tensile ratio of at least 2 to 1, and wherein a height-to-area aspect ratio for thermoplastic pillars penetrating the woven tubular mesh is less than 35 when a filler yarn angle is at 30° or less than 40 when a filler yarn angle is at 45°.

2. The hose of claim 1 wherein the woven tubular mesh consists essentially of para-aramid fibers.

3. The hose of claim 1 wherein the thermoplastic polymer is thermoplastic polyurethane and/or thermoplastic vulcanizate.

4. The hose of claim 1 wherein the hose has a continuous length of at least 300 feet and a diameter of at least 4.5 inches when the hose is in use.

5. The hose of claim 4 wherein the continuous length is less than or equal to 1,320 feet and the inner diameter is less than or equal to 16 inches.

6. The hose of claim 1 wherein the hose has tensile strength greater than 75,000 pounds.

7. The hose of claim 1 wherein the hose has tensile strength between 100,000 and 200,000 pounds.

8. The hose of claim 1 wherein the thermoplastic polymer is extruded through the woven tubular mesh so as to create contiguous layer of the thermoplastic polymer on both of inner and outer facings of the woven tubular mesh.

9. The hose of claim 1 wherein the hose has a bending radius of at least 90 degrees without kinking or permanently deforming the woven tubular mesh or the thermoplastic polymer.

10. A single layer hose comprising:
   a woven tubular mesh having a warp yarn with a stated thickness and a filler yarn with a thickness, said warp and filler yarns woven in a pattern to produce a nominal height and a gap area in the woven tubular mesh;
   a thermoplastic polymer extruded through the woven mesh to produce contiguous layers of thermoplastic on either side of the woven tubular mesh and to completely fill the gap area along the nominal height throughout the woven tubular mesh; and
   wherein the woven tubular mesh has a height-to-area aspect ratio for thermoplastic pillars penetrating the woven tubular mesh that is less than 35 when a filler yarn angle is at 30° or less than 45 when a filler yarn angle is at 45°.

11. The hose of claim 10 wherein the woven tubular mesh has a height-to-area aspect ratio for thermoplastic penetrating the woven tubular mesh that is between 14 and 32 when a filler yarn angle is at 30° or between 16 and 38 when a filler yarn angle is at 45°.

12. The hose of claim 10 wherein the thermoplastic polymer consists essentially of thermoplastic polyurethane and/or thermoplastic vulcanizate.

13. The hose of claim 10 wherein the hose has a continuous length of at least 300 feet and an inner diameter of at least 4.5 inches when the hose is in use.

14. The hose of claim 13 wherein the continuous length is less than or equal to 1,320 feet and the inner diameter is less than or equal to 16 inches.

15. The hose of claim 10 wherein the hose has tensile strength greater than 75,000 pounds.

16. The hose of claim 10 wherein the hose has tensile strength between 100,000 and 200,000 pounds.

17. The hose of claim 10 wherein the hose has a bending radius of at least 90 degrees without kinking or permanently deforming the woven tubular mesh or the thermoplastic polymer.

18. The hose of claim 10 wherein the warp and filler yarns each consist essentially of aramid fibers.

19. The hose of claim 10 wherein the hose possesses a tensile ratio of at least 2 to 1.

\* \* \* \* \*